ically, this invention relates to a process for the produc-

United States Patent Office 3,224,945
Patented Dec. 21, 1965

3,224,945
PROCESS FOR THE PRODUCTION OF ERGOT ALKALOIDS
Varro E. Tyler, Jr., % College of Pharmacy, University of Washington, Seattle 5, Wash.
No Drawing. Filed May 6, 1963, Ser. No. 278,403
5 Claims. (Cl. 195—81)

This invention relates to a process for the production of alkaloid derivatives of lysergic acid. More particularly, this invention relates to a process for the production of said alkaloids by the submerged culture of a new strain of *Claviceps paspali.*

The classical source of the lysergic acid alkaloids has been ergot, the dried sclerotium of *Claviceps purpurea* growing on naturally or artificially infected rye. Reports of the saprophytic culture of ergot have appeared in the literature from time to time. None of the reported methods of producing ergot by saprophytic culture, however, has resulted in a commercially feasible process for obtaining these important alkaloids.

More recently, Chain et al. (U.S. Patent No. 3,038,-840), have claimed the production of alkaloid derivatives of lysergic acid by submerged fermentation with certain strains of *Claviceps paspali* Stevens and Hall. The same group has published its findings in a British Journal [Arcamone et al., Proceedings of the Royal Society (London), B 155, 26–54 (1961)]. A major disadvantage of this process resides in the necessity of "virulenting" the said strains by inoculating rye embryos, before germination, with the organisms, cultivating the same, and isolating the sclerotia obtained from the said embryos in order to obtain a subspecies which is capable of elaborating the lysergic acid alkaloids upon subsequent fermentation.

It is an object of this invention to provide a method for the production of derivatives of lysergic acid by a fermentation process. A further object of the invention is to provide such derivatives by means of a commercially feasible saprophytic culture process. Still another object of the invention is to provide alkaloid derivatives of lysergic acid by the saprophytic culture of organisms which do not require artificial virulentation. Other objects and advantages of the invention will be apparent from the description thereof provided herein.

In accordance with the invention, it has now been found that a certain novel strain of *Claviceps paspali,* ATCC 14988, can be employed successfully in saprophytic culture to produce derivatives of lysergic acid. The said novel strain is distinguished by its ability to produce the lysergic acid alkaloids without the necessity of prior artificial virulentation, by its inability to utilize added tryptophan as a precursor to enhance alkaloid biosynthesis, and by the fact that relatively high concentrations of iron salts do not interfere with its production of alkaloid derivatives. These properties of the new strain constitute important differences between the present strain and those of Chain et al., and serve to permit differentiation of the strains. The ability of the new strain to produce alkaloids without prior virulentation also represents a marked advantage of the new strain not possessed by the organisms of the prior art. Moreover, the new strain can be employed in the present process to produce yields of lysergic acid derivatives which are uniformly reproducible and to produce such derivatives within relatively short periods of fermentation.

The strain employed in the instant invention was isolated from a sclerotium of *Claviceps paspali* parasitic upon *Paspalum dilatatum* Poir. of Australian origin, and a culture thereof has been placed on permanent deposit with the American Type Culture Collection, Washington, D.C. The said culture was submitted under the strain number 247/61 and has been assigned the ATCC accession number 14988.

Taxonomic studies carried out with *Claviceps Paspali,* ATCC 14988 are summarized in the paragraphs which follow. Observations were made at 7 and 14 days on plate cultures incubated at 26° C. Cultural observations were based on colony characteristics since there appear to be no significant microscopic structures such as conidia, chlamydospores or sclerotia.

All cultures appear to contain polygonal cells, and fat droplets are present in most hyphal cells. Observation of fat droplets in the cycelia was carried out on cultures grown on potato-glucose agar by Burdon's method as described on page 20 of Leaflet IV of the Manual of Methods for Pure Culture Study of Bacteria, Biotech Publications (1951). In the descriptions which follow, numbers in parentheses refer to color blocks in Maerz and Paul, *Dictionary of Color* (1950).

COLONY CHARACTERISTICS OF
*CLAVICEPS PASPALI,* ATCC 14988

*Corn steep medium.*—Vegetative growth abundant, compact, smooth, deep red-brown (15–1OE); margin radiative; aerial mycelium fasciculate, light brown (11–2E); colorless exudate; brown soluble pigment.

The medium is prepared by combining the following ingredients and adjusting to pH 5.6:

| | G. |
|---|---|
| Corn steep solids | 10 |
| Cerelose | 5 |
| Sucrose | 10 |
| $KH_2PO_4$ | 0.5 |
| $Mg_2SO_4 \cdot 7H_2O$ | 0.3 |
| Agar | 20 |
| Water, q.s., 1000 ml. | |

*Potato-glucose medium.*—Vegetative growth moderate, red-brown (14–11E3); aerial mycelium floccose, white; neither exudate nor soluble pigment produced.

The medium is prepared by steaming 40 g. of potatoes for 30 minutes in 500 ml. of water. To the resulting mixture are added 5 g. of glucose, 17 g. of agar, and sufficient water to make the total volume 1000 ml.

*Czapek's agar.*—No growth.

*Sasamino acid-sucrose medium.*—Vegetative growth fair, res*tri*cted, deep brown (16–10A); margin radiative; aerial mycelium floccose, dark brown (12–6E); brown soluble pigment.

*Alphacel-coconut milk medium.*—Vegetative growth fair, smooth, brown (14–8F); aerial mycelium white, velutinose; brown soluble pigment.

This is a modification of the medium of Sloan et al., Mycologia 52, 47–63 (1960). The composition of the medium is as follows:

| | | |
|---|---|---|
| Alphacel [1] | g | 20 |
| $MgSO_4 \cdot 7H_2O$ | g | 1 |
| $KH_2PO_4$ | g | 1.5 |
| $NaNO_3$ | g | 1.5 |
| Coconut milk [2] | ml | 50 |
| Tomato paste | g | 2.5 |
| Baby oatmeal (Heinz) | g | 2.5 |
| Agar | g | 20 |
| Water, q.s., 1000 ml. | | |

[1] Cellulose (Nutritional Biochemical Corp.).
[2] Marga-Rita coconut juice (Dairy Fresh Products Co.).

For the preparation of alkaloid derivatives of lysergic acid, the hitherto unknown strain of *C. paspali* is cultivated in a culture medium containing assimilable sources of carbon, nitrogen and inorganic salts. The organisms are isolated from the dry sclerotia obtained from the parasitized *Paspalum dilatatum* after the sclerotia have been subjected to surface sterilization. A preferred procedure consists in thoroughly brushing the dry sclerotia and then shaking successively with portions of aqueous n-propanol, aqueous formaldehyde, and sterile distilled water. Thin segments are then cut from the dried sclerotia and are placed on agar slants to germinate. After a suitable incubation period, the vegetative mycelium is scraped from the agar slant and is introduced into a small volume of a preculture medium in which growth is permitted to continue. After a period of several days, usually from about 4 to 8 days, abundant proliferation of the mycelium is apparent. The mycelium so obtained is transferred aseptically to the production medium, whereupon a further incubation period of between about 5 and about 15 days produces an abundant yield of mycelium, which is separated by filtration. The mixture of lysergic acid alkaloids is recovered from the culture broth filtrate by the usual solvent extraction techniques, and can be separated into the individual alkaloids by known procedures. Alternatively and preferably, the alkaloid mixture can be converted by hydrolysis with alkali to lysergic and isolysergic acids, which can be employed to prepare desired derivatives of these acids by synthetic procedures.

The culture medium for producing the lysergic acid alkaloids by cultivation of the new strain of *C. paspali* can be any one of several media, since the organism is capable of utilizing different energy sources. However, for economy of production, maximum yields of alkaloids, and ease of recovery of the products, certain culture media containing relatively simple nutrient sources are preferred. For example, the media which are useful in the production of the alkaloids include an assimilable source of carbon such as glucose, sucrose, starch, molasses, dextrins, corn steep solids, corn syrup liquor, sorbitol, mannitol, lactose, and the like. A preferred source of carbon is mannitol. Additionally, the media employed contain a source of assimilable nitrogen such as oatmeal, meat extracts, peptones, amino acids and their mixtures, proteins and their hydrolysates, corn steep liquor, soybean meal, peanut meal and ammonium salts of organic acids such as the citrate, acetate, malate, oxalate, succinate, tartrate and like salts.

Mineral salts, for example those providing chloride, nitrate, carbonate, sulfate, phosphate, calcium, magnesium, sodium, potassium, iron, zinc, manganese and like ions are also incorporated in the media with beneficial results.

As is necessary for the growth and development of other microorganisms, essential trace elements should also be included in the culture medium for growing the organisms employed in this invention. Such trace elements are commonly supplied as impurities incidental to the addition of the other constituents of the medium.

Submerged aerobic cultural conditions are the conditions of choice for the production of the lysergic acid alkaloids by the processes of this invention. For preparation of relatively small amounts, shake flasks and surface culture in bottles can be employed, but for the preparation of larger quantities, submerged aerobic culture in sterile tanks is preferred. The medium in the tank can be inoculated directly with the mycelium obtained from the agar slant. However, in order to avoid the growth lag experienced when this procedure is employed and the relatively inefficient use of the fermentation equipment resulting therefrom, an alternative procedure is preferably employed. Furthermore, it has been found that higher yields of the lysergic acid alkaloids ultimately result when a vegetative inoculum is grown in a suitable preculture medium, the composition of which differs from that of the final production medium. Accordingly, it is desirable to transfer the mycelium from the agar slant into a preculture medium favorable for rapid mycelial development and, after a well-developed vegetative inoculum has been so obtained, to transfer the vegetative inoculum under suitable conditions to the production medium in the large tank. Thus, for example, a preculture medium containing corn steep solids and/or corn syrup solids is especially suitable for the production of the vegetative inoculum since large quantities of mycelium are produced in submerged culture in a short time and excellent alkaloid yields result when this mycelium is used as inoculum. However, the presence of corn steep or corn syrup solids in the production medium has a detrimental effect upon the yield of alkaloids produced in some production media. Consequently, it is usually desirable to filter and wash the mycelium produced in such a preculture medium prior to the inoculation of the production medium therewith.

As is customary in submerged culture processes, sterile air is blown through the culture medium. For efficient growth of the organism and optimum alkaloid production, the volume of air employed in tank production is preferably at least about 0.1 volume of air per minute per volume of culture medium, and will generally range from about 0.2 to about 2 volumes/volume/minute.

The organisms grow best at temperatures in the range of about 22° C. to about 28° C. Optimal production of alkaloids appears to occur at a temperature of about 23° C. to 24° C.

The initial pH of the culture medium can vary somewhat. However, it has been found desirable that the initial pH of the medium be between about pH 4 and about pH 6, preferably from about pH 5 to about pH 6. As is observed in other fermentation processes the pH of the medium changes gradually throughout the growth period of the organism, the final pH being dependent at least in part upon the initial pH of the medium, the buffers present in the medium, and the period of time the organism is permitted to grow.

For optimum production of alkaloids, it is important that the mycelium employed for the inoculation of a liquid culture medium be maintained on solid media exclusively prior to transfer to submerged culture. Thus, for example, yields are significantly depressed when the mycelium has been transferred from a submerged culture to surface culture on solid media prior to inoculation into submerged culture. The optimum route for preparation of inoculum therefore is from surface culture to submerged medium or from surface culture, through a series of transfers on surface culture, to submerged medium.

An important feature of the invention is the discovery that the addition of 1,2-propanediol to the culture medium has a marked stimulatory effect on the production of alkaloids. Concentrations of between about 1 percent and about 5 percent (weight/volume) of this dihydric alcohol can be employed with beneficial results, a concentration of about 3 percent being preferred.

It is of interest to note that addition of tryptophan to the culture medium does not appear to enhance the production of alkaloids by the new strain of *Claviceps paspali* employed herein. Also noteworthy is the fact that relatively high concentrations of iron appear to promote, or at least support, alkaloid synthesis by this strain. Thus, for example, concentrations of $FeSO_4 \cdot 7H_2O$ in the range of 100–200 mg. per liter appear to be without detrimental effect.

Although the present description has been directed primarily to one strain, it is to be understood that natural or artificial mutants thereof are within the scope of the invention. Such mutants are obtained by methods well known in the art, such as by natural strain selection, by chemically induced mutation, or by mutation induced by irradiation with ultraviolet or X-radiation.

The practice of the invention is illustrated by the examples which follow.

*Example 1*

Dry sclerotia of *Claviceps paspali*, ATTC No. 14988, are brushed thoroughly and are then shaken successively for two-minute periods with 50 percent aqueous n-propanol and 4 percent aqueous formaldehyde solutions to effect sterilization. The sclerotia are then rinsed thoroughly with three portions of sterile distilled water. Thin segments are cut from the treated sclerotia with a razor blade and are then grown for seven days at room temperature in 1 x 6 inch test tubes on an agar slant medium having the following composition:

| | G. |
|---|---|
| Corn Steep solids | 10 |
| Cerelose | 5 |
| Sucrose | 10 |
| $KH_2PO_4$ | 0.5 |
| $MgSO_4 \cdot 7H_2O$ | 0.3 |
| Bacto-Agar (Difco) | 20.0 |
| Distilled water, q.s. 1000 ml. | |

The pH of the slant medium is adjusted to 5.6 with concentrated ammonium hydroxide.

The mycelia from each slant are harvested and suspended in about 10 ml. of distilled water. The suspension is divided into 2.5 ml. portions, each of which is employed to inoculate 50 ml. of a preculture medium contained in a 250 ml. of wide-mouth Erlenmeyer flask fitted with a milk-filter cap. The composition of the preculture medium is as follows:

| | G. |
|---|---|
| Corn steep solids | 20 |
| Cerelose | 10 |
| Sucrose | 20 |
| $KH_2PO_4$ | 1 |
| $MgSO_4 \cdot 7H_2O$ | 0.3 |
| Distilled water, q.s. 1000 ml. | |

The medium is sterilized by autoclaving at 121° C. for twenty minutes. The pH of the sterilized medium is about 5.5. The flasks containing the inoculated preculture medium are incubated for about seven days at about 24° C. on a gyratory shaker having a 1.5-inch throw at 250 r.p.m.

The mycelia from each flask are filtered, washed with sterile distilled water, transferred to a similar flask containing about 50 ml. of a production medium, and incubated under the same conditions for seven additional days. The production medium has the following composition:

| | G. |
|---|---|
| Ammonium succinate | 30 |
| Mannitol | 30 |
| $KH_2PO_4$ | 1 |
| $MgSO_4 \cdot 7H_2O$ | 0.3 |
| 1,2-propanediol | 30 |
| Distilled water, q.s. 1000 ml. | |

The pH of this medium is adjusted to about pH 5.1 with hydrochloric acid.

The fermentation broths from a number of flasks are pooled and filtered to separate the mycelia and the mycelia are washed once with distilled water and twice with a 2 percent aqueous tartaric acid solution. The combined washes and broth filtrate are adjusted to pH 8.6 with concentrated ammonium hydroxide and are extracted with ethylene dichloride. The ethylene dichloride extracts are washed with distilled water which has been adjusted to pH 8.6 with concentrated aqueous sodium hydroxide, dried over anhydrous sodium sulfate, and evaporated to dryness under vacuum in a rotary evaporator. A substantial yield of alkaloids of lysergic and isolysergic acids is obtained.

A quantitative determination of the alkaloids present is carried out as follows: The residue obtained after evaporation of the ethylene chloride is redissolved in a measured volume of 2 percent tartaric acid solution. To this solution are added two volumes of p-dimethylaminobenzaldehyde reagent [prepared as described by Silber et al., Pharmazie, 8, 675 (1953)] and, after mixing, the resulting solution is irradiated with a mercury vapor lamp for seven minutes. The absorbance of the solution is measured at 590 m$\mu$ in a Bausch and Lomb Spectronic 20 spectrophotometer and the alkaloid content, expressed as lysergic acid, is calculated from a standard curve prepared with U.S.P. Reference Standard ergonovine maleate.

Separation of the alkaloids in the ethylene chloride residue is achieved by chromatography. The following alkaloids are present in the mixture as determined by this method: agroclavine, chanoclavine, lysergic acid amide, isolysergic acid amide, ergonovine, lysergic acid, methylcarbinolamide and isolysergic acid methylcarbinolamide.

Instead of separating the various components of the alkaloid mixture by chromatography, the total alkaloids can be hydrolyzed to yield a mixture containing lysergic and isolysergic acids from which lysergic acid is recovered as follows: Five grams of the crude alkaloid mixture are dissolved in 100 ml. of aqueous 10 percent potassium hydroxide solution and the solution is heated at reflux temperature for one hour under a nitrogen atmosphere. The reaction mixture is cooled and acidified to Congo red with dilute aqueous sulfuric acid. The mixture is filtered and the dark solid obtained is triturated with several 100-ml. portions of ammoniacal ethanol. The remaining insoluble material is discarded. The filtrate is evaporated to dryness under diminished pressure and the residue is digested with 20 ml. of cold methanol in order to remove some resinous colored material. The mixture is cooled and filtered to separate the crude lysergic acid which, after recrystallization from water, melts with decomposition at about 238° C.

*Example 2*

The procedure of Example 1 is followed except that 20 g. of Nutrisoy–200 D (a soybean flour made by Archer Daniels Midland Company, of Minneapolis, Minnesota, containing approximately 50 percent protein, 35 percent carbohydrates, 6 percent minerals and 1 percent fat) is substituted for the corn steep solids in the preculture medium. The average level of alkaloids produced by this process is about equal to that obtained by the procedure of Example 1.

*Example 3*

The procedure of Example 1 is followed for the preparation of the seed culture employed to inoculate a preculture medium having the composition given in Example 1. About 40 ml. of the seed culture suspension so obtained is used to inoculate 800 ml. of preculture medium in a 4-liter fermentation flask. After seven days' incubation at room temperature, the mycelium is separated by filtration, washed as in Example 1, and transferred aseptically into 5 liters of the production medium of Example 1 contained in a 7-liter fermentation tank equipped with stirring means and an air sparger. Cultivation is carried out for seven days at about 24° C. with a stirring rate of 400 r.p.m., air being supplied through the sparger at the rate of 0.5 volume of air/volume of medium/minute. An abundant yield of mycelium is harvested and the culture broth filtrate is treated as in Example 1 to obtain the alkaloid mixture.

*Example 4*

By modifying the composition of the production medium employed, the necessity for filtration and washing of the mycelium from the preculture phase can be avoided.

The procedure of Example 1 is followed to obtain the vegetative inoculum produced in the preculture medium. Flasks containing the modified production medium are then seeded with 5 ml. portions of the preculture growth. The production medium employed has the following approximate composition:

| | Percent |
|---|---|
| Mannitol | 3 |
| Ammonium succinate | 4 |
| 1,2-propanediol | 2 |
| $KH_2PO_4$ | 0.1 |
| $MgSO_4 \cdot 7H_2O$ | 0.03 |

|  | Percent |
|---|---|
| Chick pea meal | 1 |
| Distilled water | Remainder |

After thoroughly mixing the components of the medium, the pH is adjusted to about pH 5.2 and incubation is carried out for 11 days at about 24° C. The mycelium is collected and the culture broth filtrate is treated as described in Example 1 to obtain the crude alkaloid mixture from which lysergic acid is obtained as described.

I claim:

1. A process for the production of alkaloid derivatives of lysergic and isolysergic acids which comprises growing *Claviceps paspali* ATCC 14988 under aerobic conditions in a culture medium containing assimilable sources of carbon, nitrogen, and inorganic salts.

2. The process of claim 1, carried out in submerged culture.

3. The process of claim 1, carried out at a temperature of between about 22° C. and about 28° C.

4. The process of claim 1 in which the culture medium contains between about 1 percent and about 5 percent of 1,2 propanediol.

5. A process for the production of a mixture of alkaloid derivatives of lysergic and isolysergic acids which comprises cultivating *Claviceps paspali* ATCC 14988 on a solid culture medium, introducing the vegetative mycelium of the said organism so obtained into a preculture medium containing assimilable sources of carbon, nitrogen and inorganic salts, cultivating under aerobic conditions the said organism in the said preculture medium for a period of time at a temperature between about 22 C. and about 28° C., inoculating mycelium obtained therefrom into a production medium containing assimilable sources of carbon, nitrogen and inorganic salts, and cultivating the said mycelium in the said production medium under aerobic conditions at a temperature between about 22° C. and about 28° C. until a substantial quantity of alkaloids has been produced.

References Cited by the Examiner

UNITED STATES PATENTS

| 2,936,266 | 5/1960 | Windisck et al. | 195—81 |
| 3,038,840 | 6/1962 | Chain et al. | 195—81 |
| 3,060,104 | 10/1962 | Chain et al. | 195—81 |

A. LOUIS MONACELL, *Primary Examiner.*

D. M. STEPHENS, *Assistant Examiner.*